United States Patent [19]

Kuhn

[11] Patent Number: 4,727,710
[45] Date of Patent: Mar. 1, 1988

[54] AUTOMATIC VEHICLE GROUND SPEED CONTROL CONVERTIBLE TO MANUAL OPERATION

[75] Inventor: Lowell L. Kuhn, Independence, Mo.

[73] Assignee: Deutz-Allis Corporation, Milwaukee, Wis.

[21] Appl. No.: 868,692

[22] Filed: May 30, 1986

[51] Int. Cl.⁴ .......................................... A01D 41/12
[52] U.S. Cl. .............. 56/10.2; 56/DIG. 15; 180/336
[58] Field of Search .............. 56/10.2, 11.1, DIG. 15; 180/336, 315

[56] References Cited

U.S. PATENT DOCUMENTS

| | | | |
|---|---|---|---|
| 3,797,208 | 3/1974 | Strubbe | 56/10.2 |
| 4,130,980 | 12/1978 | Fardal et al. | 56/10.2 |
| 4,671,378 | 6/1987 | Korrect et al. | 180/336 |

Primary Examiner—Stephen J. Novosad
Assistant Examiner—Matthew Smith
Attorney, Agent, or Firm—Charles L. Schwab

[57] ABSTRACT

A combine is provided with a ground speed control having manual and automatic operating modes. In the automatic operating mode, ground speed is adjusted to achieve a predetermined level of combine harvesting efficiency. A manual lever for controlling the ground speed includes a lost motion connection with a ground speed control member permitting it to be shifted between automatic and manual operating modes. Manual movement of the lever in a speed controlling direction while harvesting in the automatic operating mode will disestablish the automatic operating mode and reestablish a manual operating mode. Subsequent release of the lever allows resumption of an automatic operating mode.

10 Claims, 5 Drawing Figures

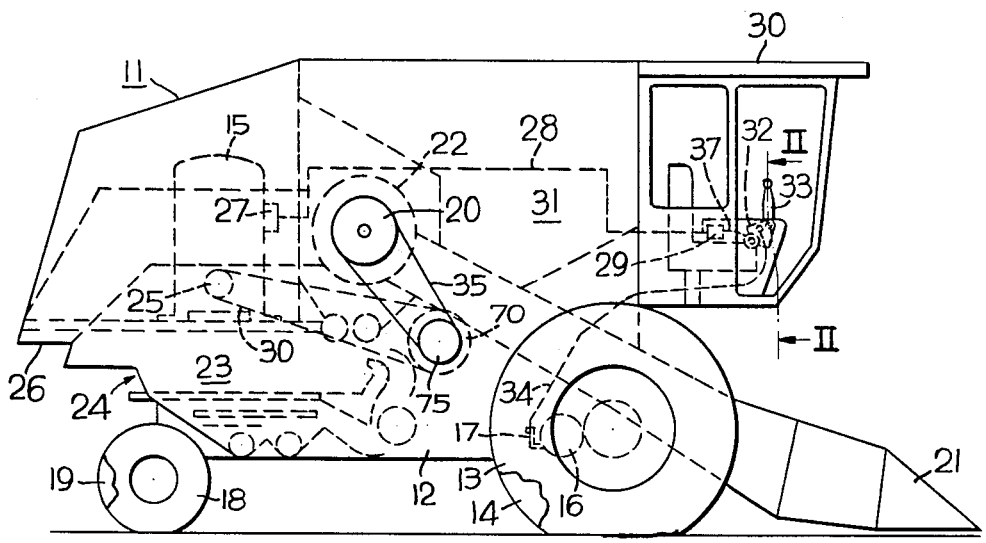
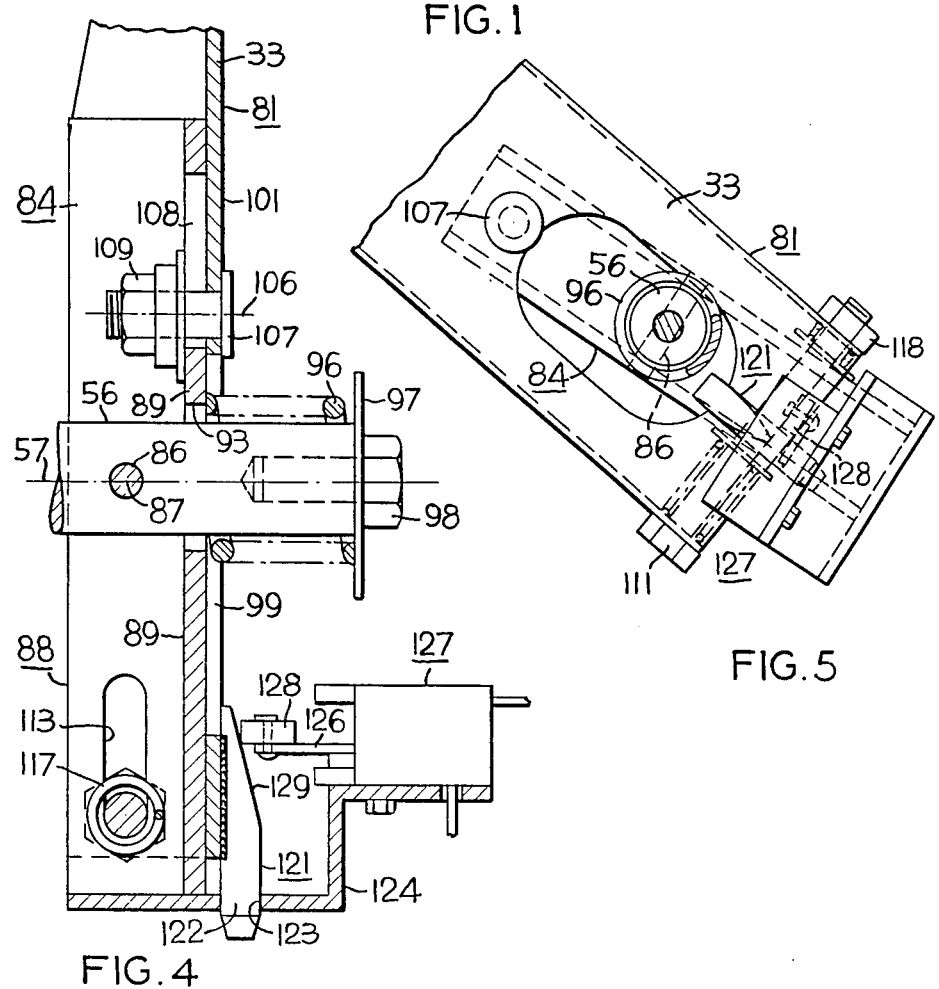
FIG. 1
FIG. 5
FIG. 4

AUTOMATIC VEHICLE GROUND SPEED CONTROL CONVERTIBLE TO MANUAL OPERATION

TECHNICAL FIELD

This invention relates to a ground speed control for a vehicle, such as a combine, which has automatic and manual operating modes.

BACKGROUND OF THE INVENTION

In harvesting a crop with a combine, it is desirable to adjust the ground speed so as to feed the crop to the processor at a rate that permits it to be efficiently threshed and cleaned without excessive loss of grain in discharged material. Heretofore, various automatic ground speed controls have been proposed to match the intake of crop to the threshing and cleaning capability of the combine. In some such automatic controls, the ground speed is controlled by an apparatus which senses the work load or torque requirements of one or more power consuming operations of the combine. In others, the ground speed control is responsive to an apparatus which senses grain loss. When operating a combine with an automatic ground speed control, conditions may arise which require a quick change to manual ground speed control. Some such conditions which might arise would include the sudden appearance of a gully, obstacle or livestock ahead of the combine. Thus, it is normal for such prior art automatic ground speed controls to have some means for allowing the operator to change to manual control of combine speed.

OBJECT AND SUMMARY OF THE INVENTION

It is an object of this invention to provide an improved automatic ground speed control for a combine having a speed control lever which when manually moved by the operator disengages the automatic mode of operation.

It is a further object of this invention to provide a ground speed control for a combine having automatic and manual modes of operation which includes a manually operable speed control lever which may be shifted in a nonspeed changing direction to establish the automatic mode of operation.

It is a further object of this invention to provide a ground speed control for a combine which may be selectively operated in a manual operating mode or in an automatic operating mode and which includes a manually operated speed control lever which is operable to select the mode of operation and which disengages the automatic operating mode, and provides manual control, if moved in a speed changing direction.

This invention has particular application in a combine having a ground speed control with automatic and manual operating modes. In such a combine, drive means are provided to propel the combine at various ground speeds and a control member is connected in speed controlling relation to the drive means whereby the ground speed is increased or decreased upon movement of the control member in opposite speed increasing and speed decreasing directions. In the automatic mode, the control member is automatically adjusted in response to means sensing the load on the engine which will generally be proportional to the torque delivered to the threshing mechanism and, thus, the ground speed is decreased as crop input to the threshing mechanism is increased thus achieving a desired level of harvesting efficiency. A switch means is operatively associated with the operating means and has an operating element shiftable between first and second positions to activate and inactivate the automatic operating mode. A manually operated lever is connected to the control member for movement therewith in the opposite speed increasing and speed decreasing directions. A switch operating member on the lever is operatively associated with the operating element of the switch means. The manually operated lever is also shiftable in a direction diverse to the direction the lever is moved for speed control and in so shifting, it moves the operating element of the switch means to select the automatic or manual operating modes. If the lever has been moved to an automatic operating mode selective position and the operator moves the lever in one of the speed increasing and speed decreasing directions, the ground speed control will switch to a manual operating mode. When the lever is subsequently released, the control will revert to an automatic operating mode.

BRIEF DESCRIPTION OF THE DRAWINGS

One embodiment of the ground speed control of this invention is shown in the drawings in which:

FIG. 1 is a side view of a combine;

FIG. 4 is an enlarged partial view showing the manual control lever shifted to a manual mode of operation; and FIG. 5 is an enlarged partial view of the manual control lever showing manual movement thereof when the control is in an automatic operating mode.

DETAILED DESCRIPTION OF THE DRAWINGS

Figure 2:
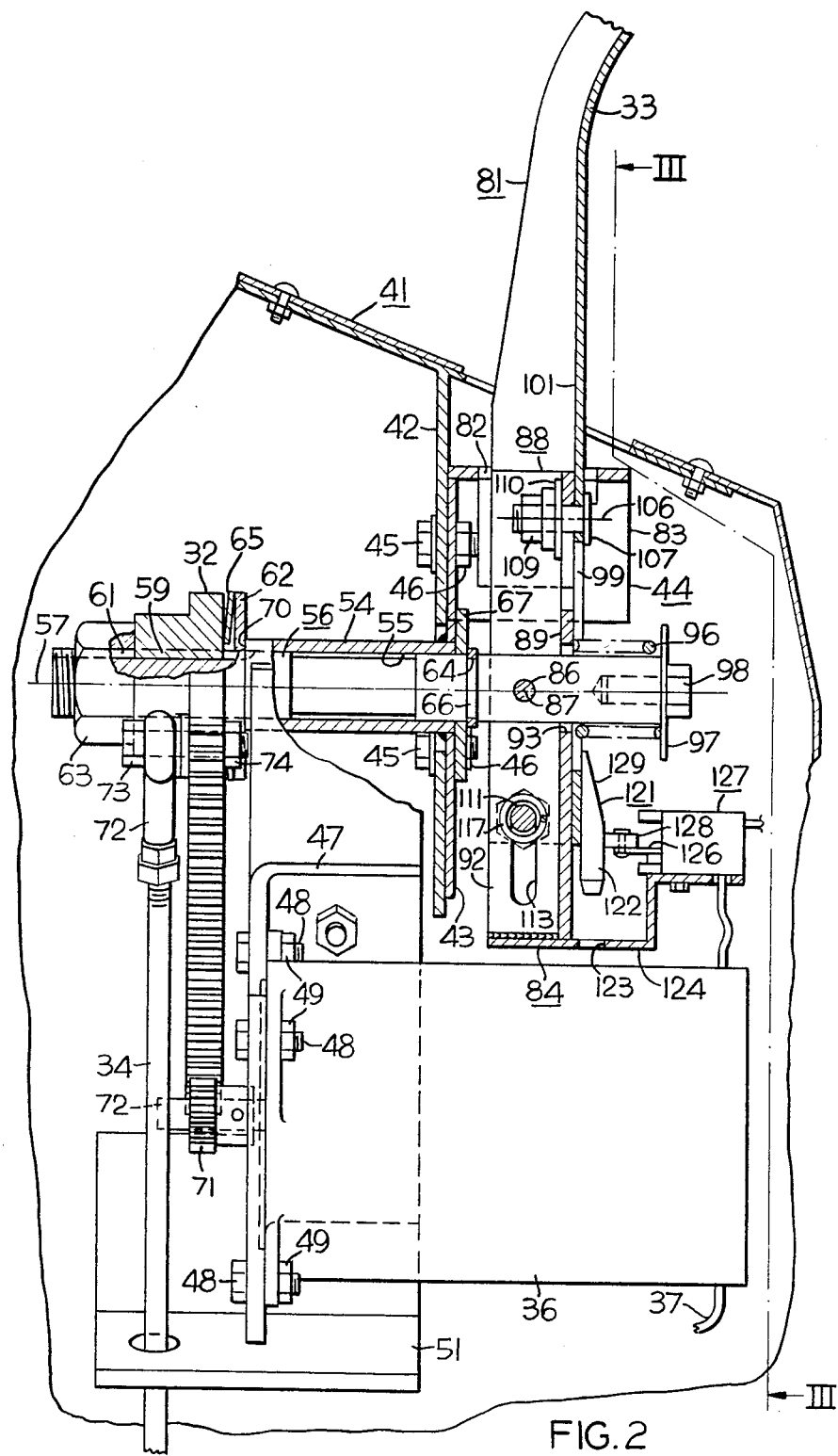
FIG. 2 is a view taken along the line II—II in FIG. 1 with parts broken way for illustration purposes and showing the control in an automatic operating mode.

Referring to FIG. 1, a self-propelled harvester or combine 11 includes a main frame 12 supported at its front end by a pair of drive wheels 13, 14 driven by an engine 15 through a hydrostatic transmission 16. The output speed and direction of travel is controlled by a pivotable swash plate control lever 17 on the hydrostatic transmission 16. The engine 15 also drives the threshing mechanism in the form of a processor having a rotor to which a belt pulley 20 is coaxially secured. The drive train from the engine 15 to the processor includes a pulley 25 on engine drive shaft belts 30, 35 and pulleys 70, 75. The rear end of the combine main frame 12 is supported by a pair of steerable wheels 18, 19. A header 21 severs the crop being harvested and the crop is conveyed to a processor 22 in a conventional manner where it is threshed. Grain is passed downwardly to the cleaning shoe section 23 where chaff is separated and moved to a shoe discharge 24. Straw or other large pieces of crop material are passed rearwardly to a straw discharge 26. An engine load sensor 27 is mounted on the engine 15 and senses engine load which varies with the loading of the threshing section with crop material. As the engine load increases, harvesting efficiency decreases. Thus, engine load correlates with grain loss in the discharged material. The sensor 27 is connected by an electric line 28 to a monitor control 29 at the operator's station 30 mounted on the front of the combine main frame 12 forward of the grain bin 31. The sensor 27 and the monitor control 29 form an engine load monitor which is in effect a harvesting efficiency monitor. A ground speed signal is also fed to the monitor control 29 to keep the combine ground speed within a predetermined practical speed range. The engine load monitor is a part of the ground speed control of this invention. The ground speed control also includes a control member in the form of a motion transmitting gear segment 32 to which a manually operated control lever 33 is connected.

Figure 3:
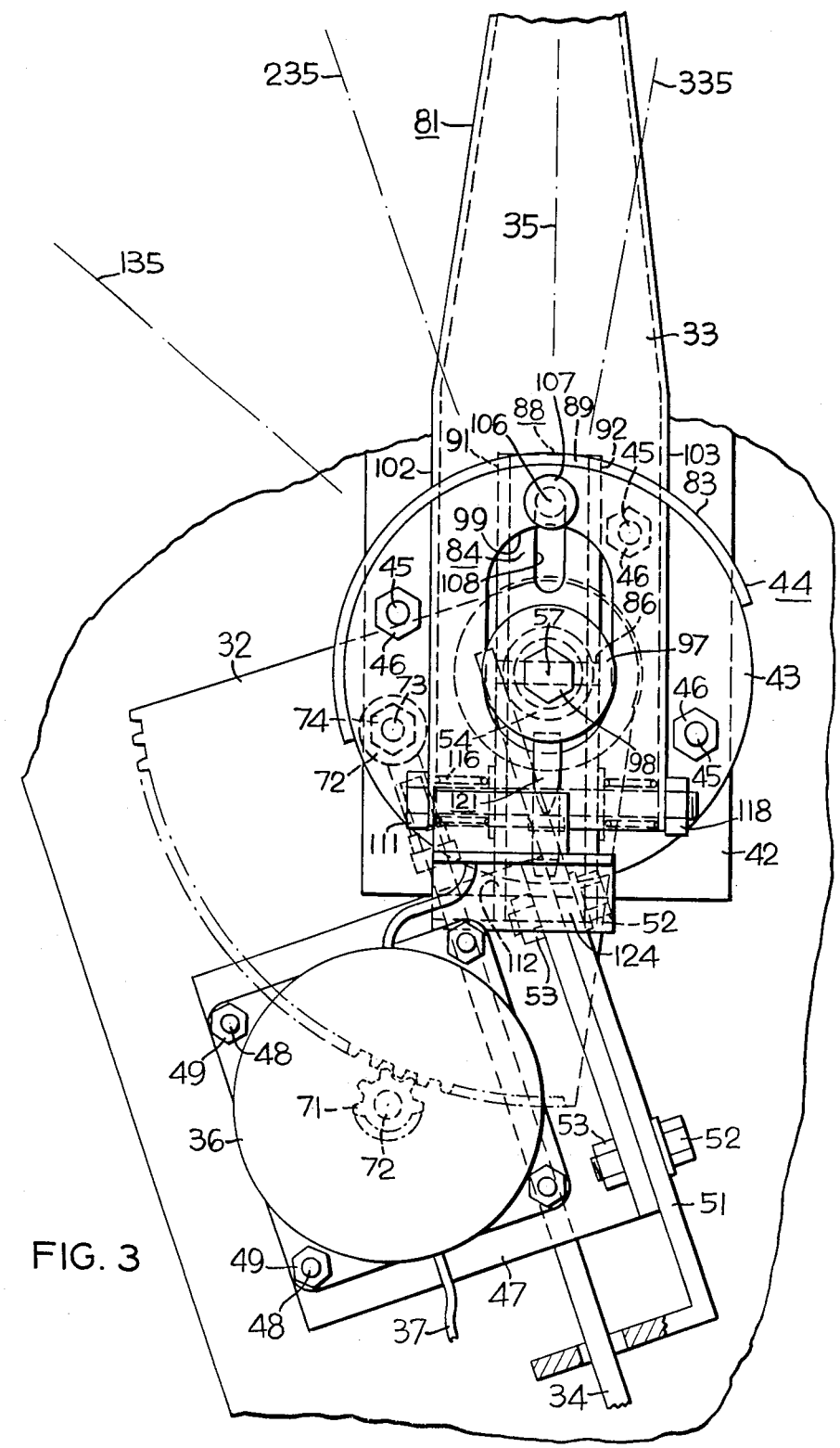
FIG. 3 is a view taken along the line III—III in FIG. 2.

As shown in FIG. 3, the manual control lever 33 is pivotable between a full speed forward position in which its longitudinal center line 35 is in the position indicated by broken line 135, a neutral position indicated by broken line 235, and a full speed reverse position indicated by broken line 335. A control cable 34 interconnects the swash plate control lever 17 of the hydrostatic transmission 16 with the gear segment 32. An electrically controlled operating means in the form of a reversible electric motor 36 is connected to the monitor control 29 by an electric line 37 and is drivingly associated with the gear segment 32 to automatically control the pivotal position of the gear segment 32 and, hence, provide an automatic operating mode for the ground speed control.

Referring also to FIG. 2, a control console 41 at the operator's station 30 includes a vertically disposed mounting wall 42 to which a vertical plate part 43 of a support 44 is secured by bolts 45 and nuts 46. The electric motor 36 is bolted to an L-shaped bracket 47 by bolts 48 and nuts 49 and the L-shaped bracket 47 is secured to a support flange 51 of the support 44 by bolts 52 and nuts 53. The upper end of the flange 51 is welded to a bearing sleeve 54 of the support 44 and one end of the bearing sleeve 54 is welded to the plate part 43. A shaft 56 extends through and is supported by the cylindrical bore surface 55 of bearing sleeve 54 for pivotal movement about a horizontal pivot axis 57. The gear segment 32 includes an axial opening with an axially and downwardly extending spline 59 which fits into an axially extending recess 61 in the shaft 56. A flat washer 62 and a belleville washer 65 are placed on the shaft between the gear segment 32 and an axial end surface 70 of the bearing sleeve 54, and a nut 63 threadedly engages a threaded end of the shaft 56. A snap ring 64 fits in an annular snap ring groove 66 in the shaft 56 and a washer 67 is positioned on the shaft 56 between the snap ring 64 and the right-hand axial end surface of the bearing sleeve 54. Thus, the gear segment 32, the shaft 56, and the lever 33 are frictionally held in any operating position to which adjusted through the action of the resilient biasing means in the form of belleville washer 65, the washers 62, 67 and the end surfaces of the sleeve 54. The teeth of a small spur gear 71, which is nonrotatably secured to the output shaft 72 of the motor 36, mesh with the teeth of the gear segment 32. The swash plate control cable 34 has a connector 72 at its upper end which is pivotally connected to the gear segment by a pivot bolt 73 and a nut 74.

The control handle or lever 33 includes a first upstanding manual grip part 81 which extends through a vertical opening 82 in an arcuate abutment plate 83 and connects at its lower end with a second support part 84 which is pivotally connected to the shaft 56 by a pin 86 for slight pivotal movement about a horizontal axis 87 which intersects axis 57 at a 90 degree angle. The support part 84 of the handle 33 includes a channel shaped portion 88 having a web 89 transverse to the shaft 56 and a pair of spaced parallel flanges 91, 92 extending from the web 89 in directions parallel to the axis 57 of the shaft 56. The pivot pin 86 extends through aligned openings in the flanges 91, 92 and the web includes a round opening 93 through which the shaft 56 extends. The opening 93 is sufficiently large to permit limited pivotal movement of the control handle 33 about the transverse axis 87. A coil compression spring 96 surrounds the end of the shaft 56 and is held in axial thrust transmitting engagement with support part 84 of the handle 33 by a washer 97 and cap screw 98 secured to the end of the shaft 56. The spring 96, which extends through a large opening 99 in the flange 101 of the part 81, maintains the control lever 33 in the upright position shown in FIG. 2 in which it is perpendicular to the shaft 56.

The lower end of the grip part 81 of the handle 33 is also channel shaped with a web 101 in sliding abutment with the web 89 of the part 84 and has a pair of flanges 102, 103 spaced from and on outboard sides of the flanges 91, 92 of the part 84. A pair of pin and slot connections between the parts 81, 84 allow part 81 to be shifted vertically relative to part 84 and permit the part 81 to be pivoted relative to part 84 about the axis 106 of a pivot bolt 107. The two pin and slot connections cause the two parts to pivot as a unit about the transverse axis 87. One of the pin and slot connections includes the pivot bolt 107 which extends through a bore in web 101 of the part 81 and through a vertically elongated slot 108 in the web 89 of the part 84. The pivot bolt 107 is held in assembly by a nut 109 and a belleville washer 110. The other pin and slot connection includes a transversely extending bolt 111 extending through aligned bores in the flanges 102, 103 of part 81 and through vertically elongated slots 112, 113 in the flanges 91, 92 of the part 84. A pair of coil compression springs 116, 117 surround the bolt 111 and are disposed between confronting flanges of the parts 81, 84 and a nut 118 secures the bolt 11 in place on the lever part 81.

A vertically extending switch operating member in the form of a camming finger 121 is welded to the lower end of the flange 101 of the part 81 of the control lever 33 and includes a tapered locking member 122 at its lower end which extends below the part 81 so that when the latter is shifted downwardly from its automatic operating mode position, shown in FIGS. 2 and 3, to its manual operating mode position, as shown in FIG. 4, the locking member 122 extends through a mating locking member in the form of a vertical bore 123 in a bracket 124 welded to the bottom of the channel shaped portion 88 of part 84. Thus, in the manual mode, the parts 81 and 84 are releasably secured together for movement in unison by locking members in the form of the finger 121 and the bracket 124. In this locked position, the switch operator element 126 of an electric switch 127 mounted on the bracket 124 is in a deactivate or off position in which the automatic monitor control 29 does not transmit electric energy to the motor 36. The switch 127 is preferably in series with the motor 36, however, it could be used to control a relay operated switch, not shown, in the motor supply line 37. When the lever part 81 is shifted downwardly, the roller 128 on the element 126 slides on the camming surface 129 as the spring biased element 126 swings away from the main body of the switch 127. Switch 127 is not only moved from its "on", or automatic mode position, to its "off", or manual mode position, by downward movement of the lever part 81, but is also moved to an "off"

position by fore or aft swinging movement of the upper part 81 of the lever 33 about the pin 107 in opposition to one or the other of the coil springs 116, 117. For instance, as shown in FIG. 5, the roller 128 moves off the finger 121 when the lever part 81 is moved clockwise from a high speed position. Upon deactivating the motor, the handle 33 is then able to rotate the shaft 56 and the gear segment 32 to cause the control cable 34 to shift the swash plate control lever 17 to a lower speed position even though the handle part 81 is in its automatic operating mode position.

OPERATION

The manual operating mode is normally established by pushing the lever part 81 downwardly to engage the locking members, that is, engage the peg 122 in the hole 123, thereby locking the two parts 81 and 84 of the control lever 33 for unitary pivotal movement about the horizontal axis 57. When the lever 33 is pushed forwardly from its neutral position, clockwise as viewed in FIG. 1, the control cable 34 will adjust the swash plate lever to a forward drive speed position. If the control lever 33 is pivoted rearwardly, as viewed in FIG. 1, from its neutral position, the combine will travel in reverse. The further the lever 33 is pivoted from its neutral position, the faster the ground speed will be to the limit of the swash plate movement in the hydrostatic transmission 16. In the manual operating mode, as illustrated in FIG. 4, the roller 128 and its supporting element 126 move to an "off" position in which the switch 127 disconnects the reversible motor 36 from the monitor control 29 thereby deactivating the automatic operating mode of the ground speed control. The manual operating mode is the normal mode of operation when the combine is being driven to and from a field or between fields being harvested. It is also the mode used by the operator during harvesting when making a sharp turn, operating near fence lines or obstructions, or whenever it is prudent to operate the combine under direct control of the operator.

When field conditions permit, it is desirable to operate the combine in its automatic operating mode so as to achieve a desired level of harvesting efficiency. The automatic operating mode is selected by pulling the upper part 81 of the control lever 33 upwardly to the position shown in FIGS. 2 and 3 in which the switch 127 is closed to connect the motor 36 to the monitor control 29. As this movement occurs, the locking member 121 is disconnected from the locking member 124 on the lower part 84 of the control lever 33. In this automatic operating mode, the monitor control senses engine load and adjusts ground speed to meet preset parameters which are designed to achieve a predetermined level of harvesting efficiency. If when harvesting in the automatic operating mode the operator needs to suddenly change combine speed, he may instinctively push or pull the lever, in which case the lever part 81 together with its attached switch operating member 121 will rotate relative to the lower part 84 as permitted by the centering springs 116, 117, the roller 128 of the switch will roll off the member 121 and the switch 127 will open to disengage the automatic operating mode. Further movement of the control lever 33 manually adjusts the ground speed control. If, in such an emergency situation, the operator pushes down on the control lever 33, the manual operating mode is restored and subsequent pivotal movement of the control 33 manually adjusts ground speed. Thus, if an obstacle suddenly appears in the field ahead of the combine, and the operator reacts by pulling the control lever toward neutral rather than first pushing down on the lever, the manual operating mode will be effected and the combine will be slowed or stopped as desired. As long as the operator holds on to the lever during such a sudden speed reduction, the friction between the gear quadrant 32 and the support 44 will prevent the centering springs 116, 117 from recentering the parts 81, 84 of the control handle. If, however, the operator releases the control handle 33, the upper part 81 of the control handle will be rotated by the centering springs 116, 117 to an aligned position with part 84 in which the switch operating member 121 will cam the switch operator element 126 to its "on" position thereby restoring the automatic operating mode. Thus, during an automatic operation mode, this control permits an operator to temporarily manually control the combine speed in an emergency situation by merely moving the control lever 33 in a speed changing direction. When the need for slow speed has ended, the operator can release the lever 33 and the combine ground speed control will again be in the automatic operating mode.

The embodiments of the invention in which an exclusive property or privilege is claimed are defined as follows:

1. In a combine having a ground speed control with automatic and manual operating modes, the combination comprising:

drive means operable to propel the combine at various ground speeds, a support, a control member connected in speed controlling relation to said drive means and mounted on said support for pivotal movement in opposite speed increasing and speed decreasing directions about a pivot axis, a harvesting efficiency monitor, operating means for automatically pivoting said control member about said axis in response to signals from said monitor to effect said automatic operating mode including a reversible motor and a control for said motor including a switch operable to establish and disestablish said automatic operating mode, a manually operable lever including a first part adapted for manual engagement by the combine operator and a second part connected for pivotal movement with said control member about said axis and extending therefrom in a radial direction, said first part including a switch operating member, a lost motion connection between said first part of said lever and said second part of said lever permitting endwise sliding movement of said first part relative to said second part toward and away from said axis from a first position in which said switch operating member causes said switch to effect said automatic operating mode to a second position in which said switch operating member causes said switch to effect disestablishment of said automatic operating mode and establishment of said manual operating mode, said lost motion connection including a resiliently yieldable connection between said parts of said lever permitting limited pivotable movement of said first part of said lever in said speed increasing and speed decreasing directions relative to said control member from a normal position occupied by said first part and a displaced position which is occupies when said first part of said lever is manually operated in one of said speed increasing and speed decreasing directions while said speed control is in said automatic operating mode, said switch operating member causing said switch to effect a disestablishment of said automatic operating mode when said lever is in said displaced position.

2. The combine of claim 1 wherein said switch is mounted on said second part.

3. The combine of claim 2 wherein said control member includes a gear segment and said motor includes an output gear in mesh with said gear segment.

4. The combine of claim 3 wherein said control member includes a shaft pivotally mounted on said support and further comprising resiliently biased friction means between said control member and support for releasably retaining said control member in any position to which it is pivotally adjusted.

5. The combine of claim 1 and further comprising cooperable locking members on said first and second parts which lockingly engage when said first part of said lever is moved to its second position whereby said limited pivotal movement of said lever relative to said control member is prevented.

6. The combine of claim 5 wherein said switch is mounted on said second part.

7. The combine of claim 6 wherein said control member includes a shaft pivotally mounted on said support and further comprising resiliently biased friction means between said control member and support for releasably retaining said control member in any position to which it is pivotally adjusted.

8. The combined of claim 7 wherein said control member includes a gear segment and said motor includes an output gear in mesh with said gear segment.

9. In a combine having a ground speed control with automatic and manual operating modes, the combination comprising:
   drive means operable to propel said combine at various ground speeds,
   a control member connected in speed controlling relation to said drive means whereby the ground speed of said combine is increased or decreased upon movement of said control member in opposite speed increasing and speed decreasing directions,
   a harvesting efficiency monitor,
   electrically controlled operating means for automatically moving said control member in response to signals from said monitor to automatically adjust the ground speed of said combine to achieve a predetermined level of harvesting efficiency,
   an electrical switch connected to said operating means operable to establish and disestablish said automatic operating mode and including an operating element shiftable between a first position in which said operating means is electrically energized to effect said automatic operating mode and a second position in which said operating means is deenergized,
   a manually operated lever movably mounted on said combine and connected to said control member for manual operation of the latter upon movement of said lever in opposite speed increasing and speed decreasing directions, said manually operated lever including a switch operating member enagable with said operating element of said switch,
   said manually operated lever being shiftable in a direction diverse to said speed increasing and speed decreasing directions between a first position in which said operating element is in its first position to effect said automatic operating mode and a second position in which said operating element is in its second position to disestablish said automatic operating mode, said manually operated lever being movable in said speed increasing and speed decreasing directions when in its first position and when in its second position, said operating element shifting to said second position to disestablish said automatic operating mode when said manually operated lever is moved in one of said speed increasing and speed decreasing directions at the time said lever is in its first position.

10. In a combine having a threshing mechanism and an engine connected in driving relation to said threshing mechanism, ground speed control for said combine having an automatic operating mode wherein ground speed is adjusted at least in part in response to engine load and a manual operating mode under direct control of the operator, the combination comprising:
   drive means operable to propel said combine at various ground speeds,
   a shiftable speed control member connected to said drive means and operable to increase the ground speed of the combine when shifted in one direction and operable to decrease the ground speed of the combine when shifted in an opposite direction,
   a reversible electric motor having an output element operatively connected to said speed control member and operable to shift the latter in said directions,
   a monitor control connected in controlling relation to said motor and including an engine load sensor operatively associated with said engine and connected in signal delivering relation to said monitor control, said monitor control causing said motor to shift said speed control member in said opposite direction to decrease ground speed when engine load increases above a predetermined level and causing said motor to shift said speed control member in said one direction to increase ground speed when engine load decreases below a predetermined level,
   a switch operatively associated with said motor and including an operator element shiftable between first and second positions to respectively activate and deactivate the automatic operating mode of said ground speed control,
   a manual control lever having a first part adapted for manual engagement by the combine operator and a second part connected to said ground speed control member to cause shifting of the latter in said one and opposite directions upon said lever being moved in opposite speed increasing and speed decreasing directions, respectively,
   means mounting said switch on said second part,
   connecting means interconnecting said parts to permit limited pivotal movement of said first part in said speed increasing and speed decreasing directions,
   a lost motion connection between said parts permitting relative sliding movement of said first part relative to said second part in a direction transverse to the directions of said limited pivotal movement from an automatic operating mode position in which said limited pivotal movement is permitted to a manual operating mode position in which said limited pivotal movement of said parts is prevented,
a switch operating member mounted on said first part,
resilient centering springs operatively interposed between said parts urging the latter to occupy a centered position relative to one another from which said first part may be manually pivoted relative to said second part in said speed increasing and speed decreasing directions against the biasing of said centering springs, said switch operating member engaging said operator element to cause it to occupy one of its first and second positions when said first part is moved to its manual operating mode position and said switch operating member causing said operator element to occupy the other of its first and second positions when said first part is in its manual operating mode position,
said switch operating member and said operator element being constructed and arranged so that said limited pivotal movement of said first part relative to said second part from said centered position when said first part is in its automatic operating mode position causes said operator element to move to said one of its positions thereby changing said ground speed control from an automatic operating mode to a manual operating mode.

* * * * *